(12) United States Patent
Segev

(10) Patent No.: US 12,474,162 B2
(45) Date of Patent: Nov. 18, 2025

(54) BUMP MEASUREMENT HEIGHT METROLOGY

(71) Applicant: CAMTEK Ltd., Migdal-Haemek (IL)

(72) Inventor: Eyal Segev, Atlit (IL)

(73) Assignee: CAMTEK Ltd., Migdal-Haemek (IL)

( * ) Notice: Subject to any disclaimer, the term of this patent is extended or adjusted under 35 U.S.C. 154(b) by 499 days.

(21) Appl. No.: 18/005,352

(22) PCT Filed: Jul. 11, 2021

(86) PCT No.: PCT/IB2021/056219
§ 371 (c)(1),
(2) Date: Jan. 12, 2023

(87) PCT Pub. No.: WO2022/013704
PCT Pub. Date: Jan. 20, 2022

(65) Prior Publication Data
US 2023/0228559 A1    Jul. 20, 2023

Related U.S. Application Data

(60) Provisional application No. 62/705,730, filed on Jul. 13, 2020, provisional application No. 62/705,731, filed on Jul. 13, 2020.

(51) Int. Cl.
*G01B 11/06*     (2006.01)
*G01N 21/95*    (2006.01)
*G01N 21/956*   (2006.01)

(52) U.S. Cl.
CPC .......... *G01B 11/0633* (2013.01); *G01B 11/06* (2013.01); *G01B 11/0608* (2013.01);
(Continued)

(58) Field of Classification Search
CPC . G01B 11/0633; G01B 11/06; G01B 11/0608; G01B 11/0625; G01B 11/0675;
(Continued)

(56) References Cited

U.S. PATENT DOCUMENTS 5,999,266 A * 12/1999 Takahashi .......... G01B 11/0608
356/613
6,104,493 A *  8/2000 Fuse ................... G01N 21/9501
356/627
(Continued)

FOREIGN PATENT DOCUMENTS

CN      107683400 A      2/2018
TW      201142237 A      12/2011
(Continued)

OTHER PUBLICATIONS

Notice of Examination Opinion from the Intellectual Property Office of the Taiwan Ministry of Economic Affairs for Patent Application No. 110125731, dated Dec. 20, 2014, with English translation attached.
(Continued)

*Primary Examiner* — Dominic J Bologna
(74) *Attorney, Agent, or Firm* — Myers Wolin, LLC

(57) ABSTRACT

A method for measuring height differences between tops of multiple bumps of an upper surface of a layer, the method may include performing first measurements of the height differences between the bumps and the corresponding areas, by illuminating the bumps and the corresponding areas with first radiation; wherein the first measurements are subjected to first measurement errors; and determining the height differences between the bumps and the corresponding areas based on the first measurements and the first measurements errors.

21 Claims, 8 Drawing Sheets

Figure 1:
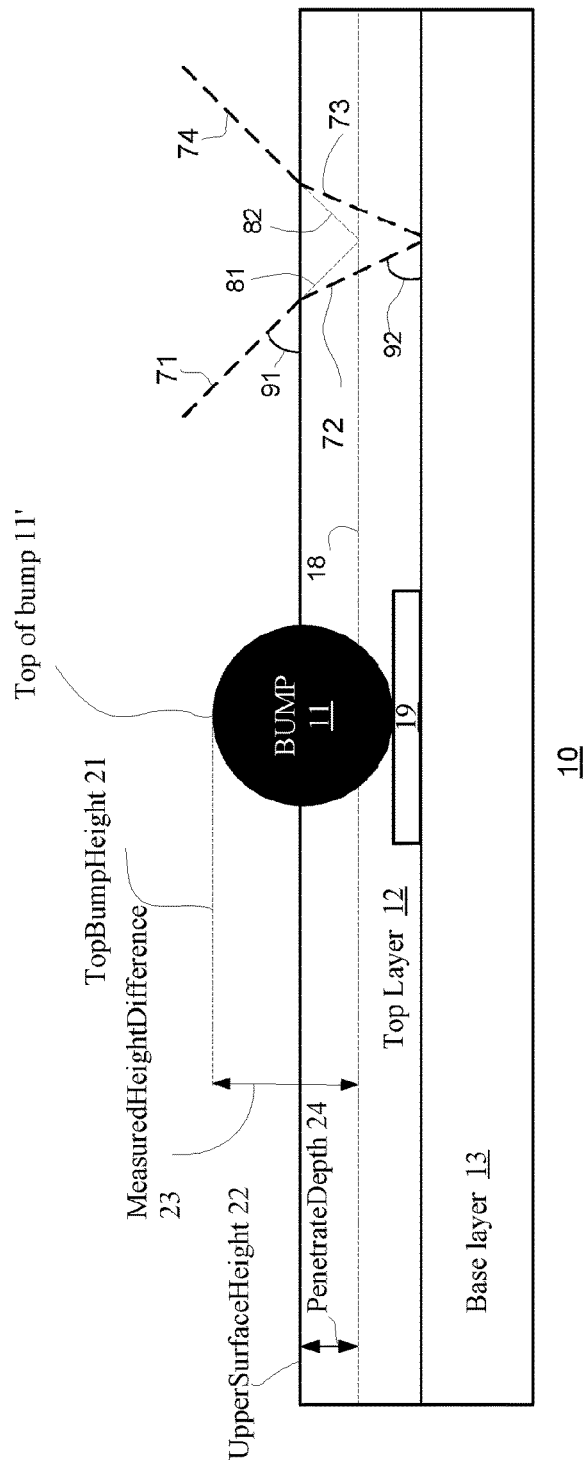

(52) U.S. Cl.
CPC ...... *G01B 11/0625* (2013.01); *G01B 11/0675* (2013.01); *G01N 21/9501* (2013.01); *G01N 21/956* (2013.01); *G01B 2210/50* (2013.01); *G01B 2210/56* (2013.01)

(58) Field of Classification Search
CPC ............ G01B 2210/50; G01B 2210/56; G01N 21/9501; G01N 21/956
See application file for complete search history.

(56) References Cited

U.S. PATENT DOCUMENTS

| | | | |
|---|---|---|---|
| 6,917,421 B1* | 7/2005 | Wihl | G01B 11/0608 356/624 |
| 7,126,699 B1* | 10/2006 | Wihl | G01B 11/0608 356/625 |
| 8,363,229 B2 | 1/2013 | Ben-Levi | |
| 8,849,015 B2 | 9/2014 | Bodony et al. | |
| 2001/0000904 A1 | 5/2001 | Hashimoto et al. | |
| 2006/0109483 A1 | 5/2006 | Marx et al. | |
| 2008/0114263 A1 | 5/2008 | Topp et al. | |
| 2010/0220340 A1* | 9/2010 | Ben-Levi | G01B 11/022 356/602 |
| 2014/0104406 A1 | 4/2014 | Pfeiffer et al. | |
| 2016/0178363 A1 | 6/2016 | Cyr et al. | |
| 2019/0242812 A1* | 8/2019 | Ben-Ezer | G01N 21/9501 |
| 2019/0355688 A1* | 11/2019 | Segev | H01L 22/12 |
| 2020/0357704 A1 | 11/2020 | Schaefer | |

FOREIGN PATENT DOCUMENTS

| | | |
|---|---|---|
| TW | 201241412 A | 10/2012 |
| TW | 201734405 A | 10/2017 |
| TW | 201925720 A | 7/2019 |

OTHER PUBLICATIONS

Search Report issued by the Intellectual Property Office of Taiwan for TW Patent Application No. 110125731, dated Dec. 23, 2024 with English translation attached.

* cited by examiner

BUMP MEASUREMENT HEIGHT METROLOGY

CROSS-REFERENCE

This application claims priority from US provisional patent filing date Jun. 13, 2020, Ser. No. 62/705,731 and from US provisional patent filing date Jun. 13, 2020, Ser. No. 62/705,730. Both provisional patents are incorporated herein by reference.

BACKGROUND

Bumps may be formed on a base layer or on an intermediate element that is formed on the base layer.

A top layer may be manufactured on the base layer. An upper part of the bump extends above the top layer. A lower part of the bump is surrounded by the top layer.

The top layer can be made of Photo-definable polyimides (PI) and/or polybenzoxazoles (PBO).

Top layers made of PI and/or PBO have been widely used as dielectrics for re-distribution layers in wafer level.

Top layers made of PI and/or PBO are partially transparent to first radiation such as visible light radiation.

Visual light based triangulation may scan the bumps and the top layer to provide height measurements.

It may be desired to measure the height difference between (a) the top of the bump, and (b) an upper surface of the top layer.

Due to the partial transparency of the top layer—the visual light based triangulation does not measure the height of the upper surface of the top layer—but rather measures the height of a virtual plane within the top layer. The virtual plane represents a virtual reflection plane within the top layer. The light changes its propagation angle when entering the top layer—due to a difference between the refraction index of the air and the refraction index of the top layer. While the light is reflected by the top surface of the base layer—the virtual plane represent a virtual reflection plane at the absence of a change in the propagation angle within the top layer.

The distance between the upper surface of the top layer and the virtual plane is referred to a virtual penetration depth (PenetrateDepth) and is unknown—the visual light based triangulation does not provide a reliable measurement of the bump properties.

There is a growing need to provide a reliable system and method for estimating the height difference between the top of bumps and the upper surface of the top layer.

SUMMARY

There may be provided a system, non-transitory computer readable medium and a method for estimating the height difference between the top of bumps and the upper surface of the top layer.

There may be provided a method for measuring height differences between tops of multiple bumps and corresponding areas of an upper surface of a layer, the method may include: performing first measurements of the height differences between the bumps and the corresponding areas, by illuminating the bumps and the corresponding areas with first radiation; wherein the first measurements may be subjected to first measurement errors resulting from a virtual penetration of the first illumination into the layer; wherein each bump has a corresponding area that may be proximate to the bump; preforming second measurements of height differences between a subgroup of the bumps and a subgroup of the corresponding areas, by illuminating the subgroup of the bumps and the subgroup of the corresponding areas with second radiation that does not penetrate the layer; wherein a duration of a second measurement exceeds a duration of a first measurement; determining first measurement errors, based on the first measurements and the second measurements; and determining the height differences between the bumps and the corresponding areas based on the first measurements and the first measurements errors.

The bumps may be spread along a round semiconductor substate, and wherein the subgroup of the bumps may be positioned at spaced apart annual regions of the semiconductor substate wafer.

The subgroup of the bumps may include less than ten percent of the bumps.

The first radiation may be white light.

The layer may include at least one of Photo-definable polyimides and polybenzoxazoles.

The determining of the height differences between the bumps and the corresponding areas may include estimating the first measurements errors related to (a) bumps that do not belong to the subgroup of the bumps, and (b) corresponding areas that do not belong to the subgroup of corresponding areas.

The estimating of the first measurements errors may include extrapolation.

The estimating of the first measurements errors may include performing radial based extrapolation.

The performing of the first measurements may include performing white light triangulation.

The performing of the second measurements may include performing interferometry.

There may be provided a measurement system for measuring height differences between tops of multiple bumps and corresponding areas of an upper surface of a layer, the system may include one or more measurement units and at least one processing unit that may be configured to: perform first measurements of the height differences between the bumps and the corresponding areas, by illuminating the bumps and the corresponding areas with first radiation; wherein the first measurements may be subjected to first measurement errors resulting from a virtual penetration of the first illumination into the layer; wherein each bump has a corresponding area that may be proximate to the bump; preform second measurements of height differences between a subgroup of the bumps and a subgroup of the corresponding areas, by illuminating the subgroup of the bumps and the subgroup of the corresponding areas with second radiation that does not penetrate the layer; wherein a duration of a second measurement exceeds a duration of a first measurement; determine first measurement errors, based on the first measurements and the second measurements; and determine the height differences between the bumps and the corresponding areas based on the first measurements and the first measurements errors.

The bumps may be spread along a round semiconductor substate, and wherein the subgroup of the bumps may be positioned at spaced apart annual regions of the semiconductor substate wafer.

The subgroup of the bumps may include less than ten percent of the bumps.

The first radiation may be white light.

The layer may include at least one of Photo-definable polyimides and polybenzoxazoles.

The measurement system may be configured to determine height differences between the bumps and the corresponding areas by estimating the first measurements errors related to (a) bumps that do not belong to the subgroup of the bumps, and (b) corresponding areas that do not belong to the subgroup of corresponding areas.

The estimating of the first measurements errors may include extrapolation.

The measurement system may be configured to perform radial based extrapolation.

The measurement system wherein a first measurement unit may be a white light triangulation unit.

The measurement system wherein a second measurement unit may be an interferometer.

There may be provided a non-transitory computer readable for measuring height differences between tops of multiple bumps and corresponding areas of an upper surface of a layer, the non-transitory computer readable store instructions for: performing first measurements of the height differences between the bumps and the corresponding areas, by illuminating the bumps and the corresponding areas with first radiation; wherein the first measurements may be subjected to first measurement errors resulting from a virtual penetration of the first illumination into the layer; wherein each bump has a corresponding area that may be proximate to the bump; preforming second measurements of height differences between a subgroup of the bumps and a subgroup of the corresponding areas, by illuminating the subgroup of the bumps and the subgroup of the corresponding areas with second radiation that does not penetrate the layer; wherein a duration of a second measurement exceeds a duration of a first measurement; determining first measurement errors, based on the first measurements and the second measurements; and determining the height differences between the bumps and the corresponding areas based on the first measurements and the first measurements errors.

The bumps may be spread along a round semiconductor substate, and wherein the subgroup of the bumps may be positioned at spaced apart annual regions of the semiconductor substate wafer.

The subgroup of the bumps may include less than ten percent of the bumps.

The first radiation may be white light.

The layer may include at least one of Photo-definable polyimides and polybenzoxazoles.

The determining of the height differences between the bumps and the corresponding areas may include estimating the first measurements errors related to (a) bumps that do not belong to the subgroup of the bumps, and (b) corresponding areas that do not belong to the subgroup of corresponding areas.

The estimating of the first measurements errors may include extrapolation.

The estimating of the first measurements errors may include performing radial based extrapolation.

The performing of the first measurements may include performing white light triangulation.

The performing of the second measurements may include performing interferometry.

BRIEF DESCRIPTION OF THE INVENTION

Figure 2:
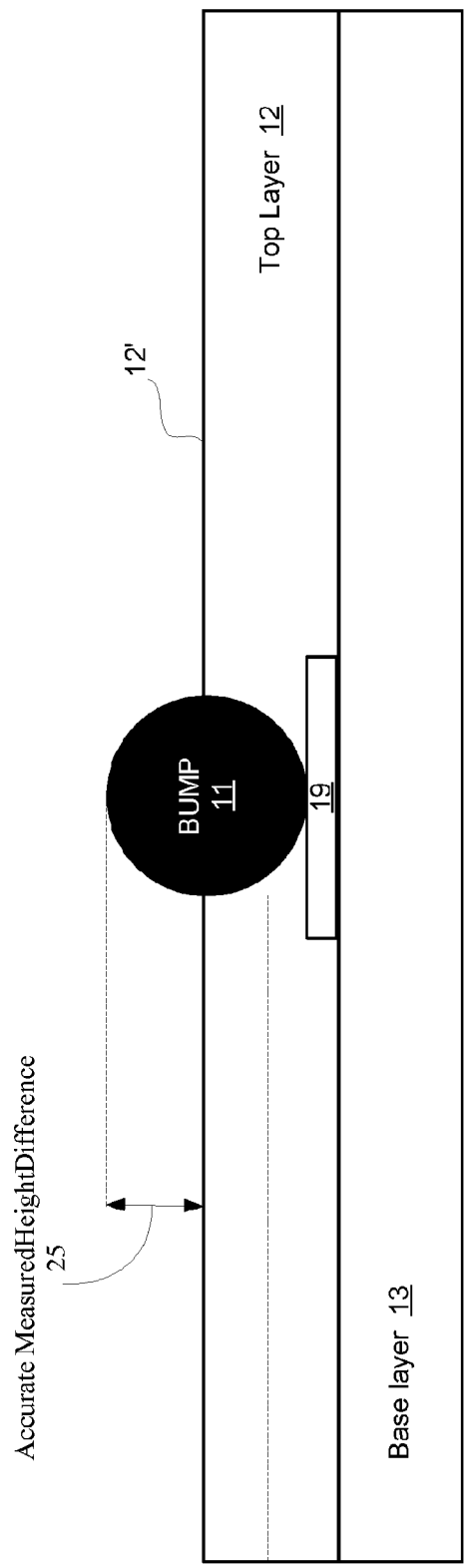
Figure 3:
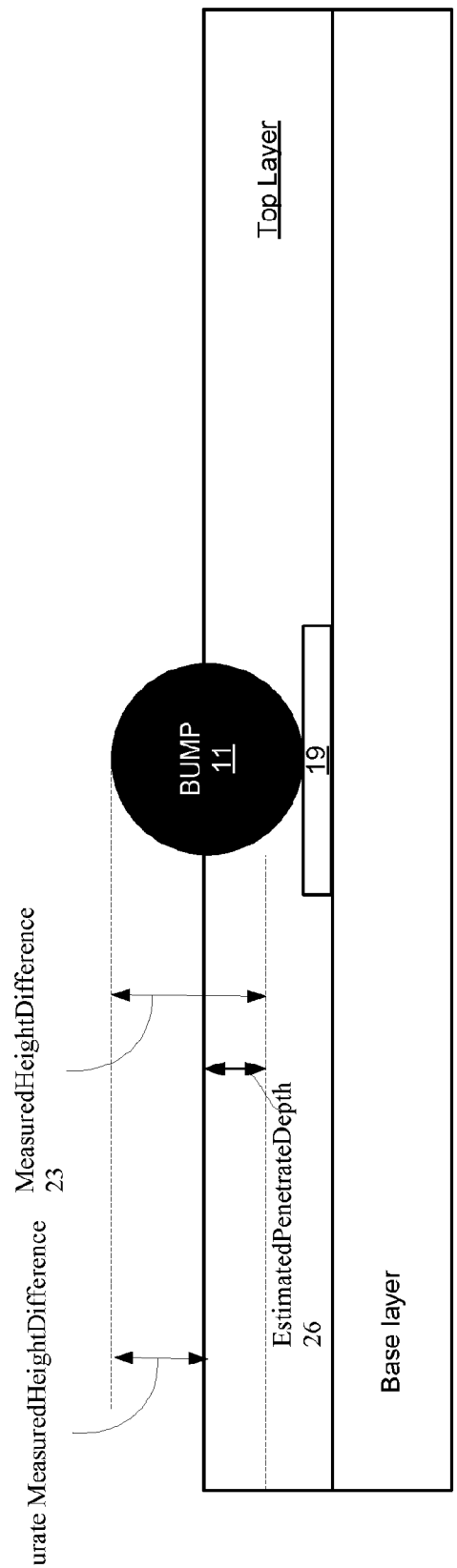
Figure 4:
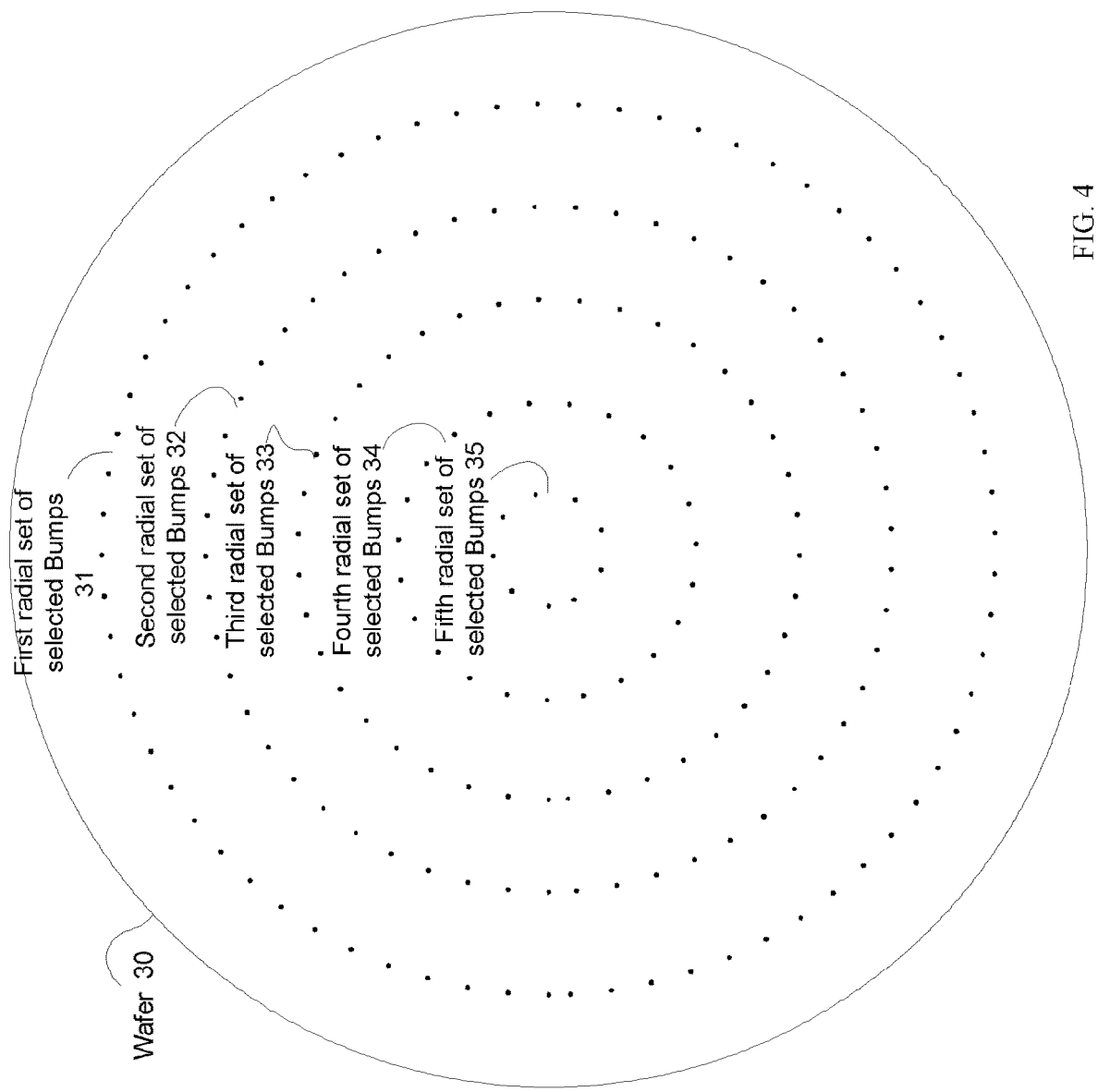
Figure 5:
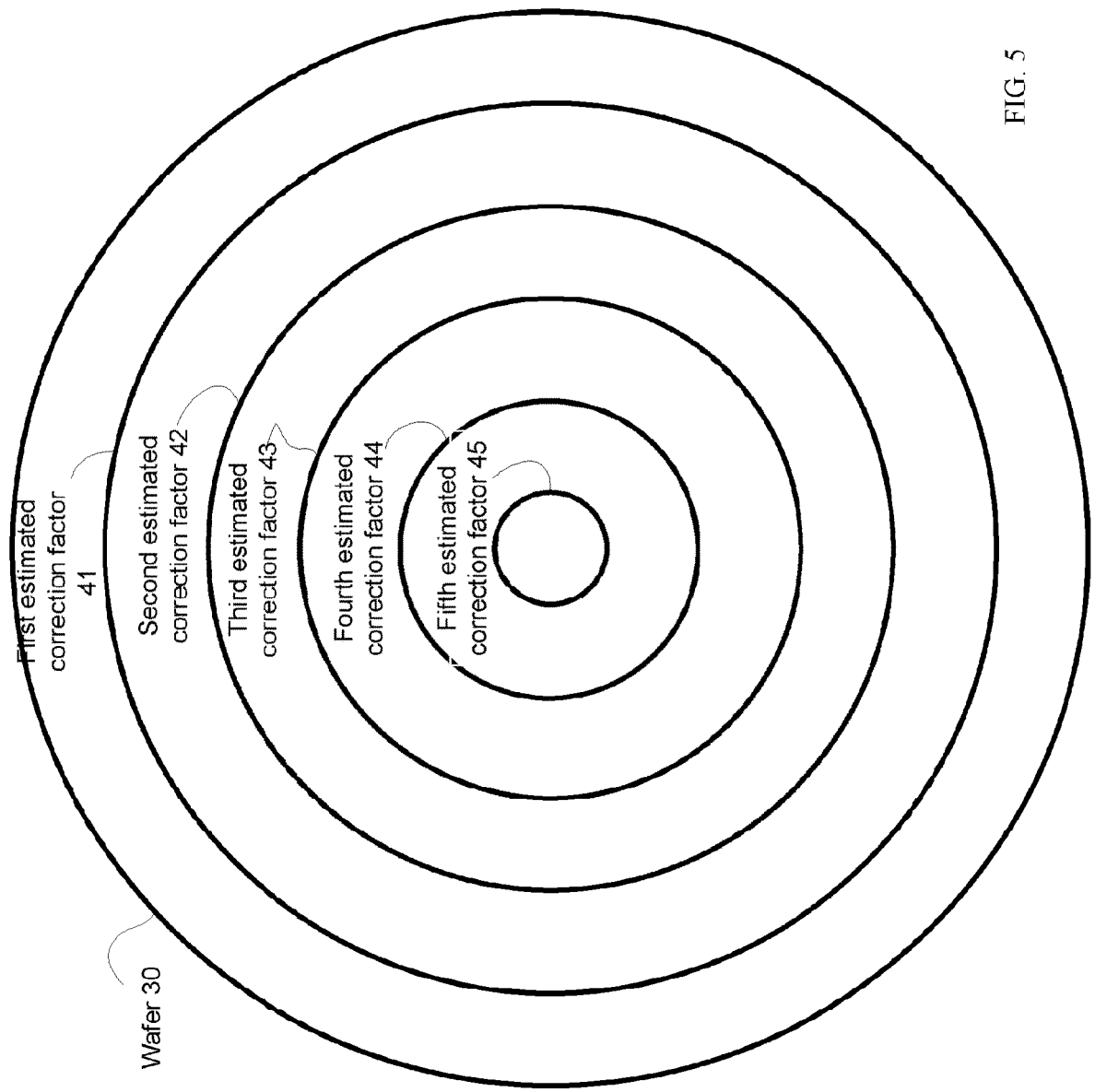
Figure 6:
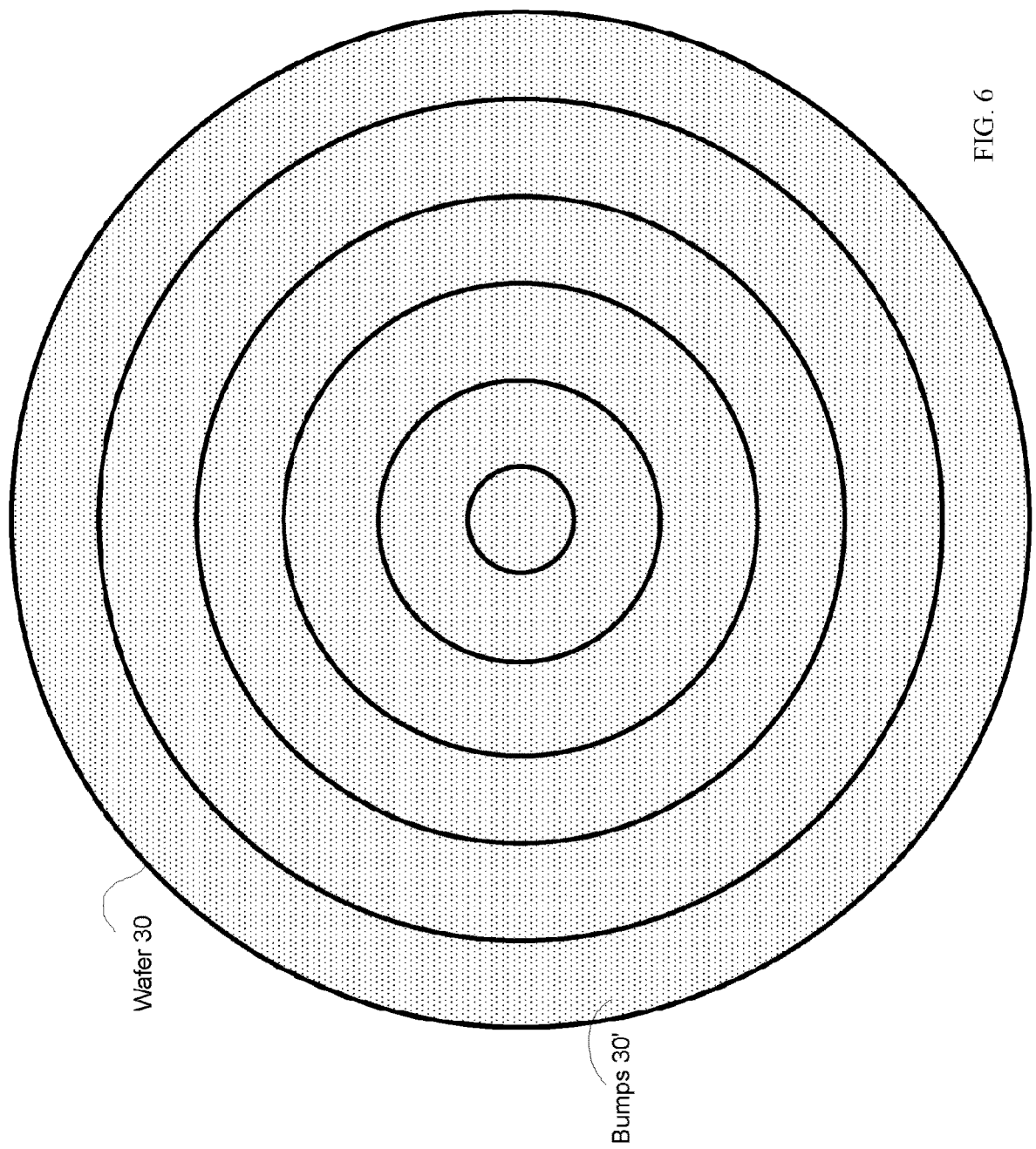
Figure 7:
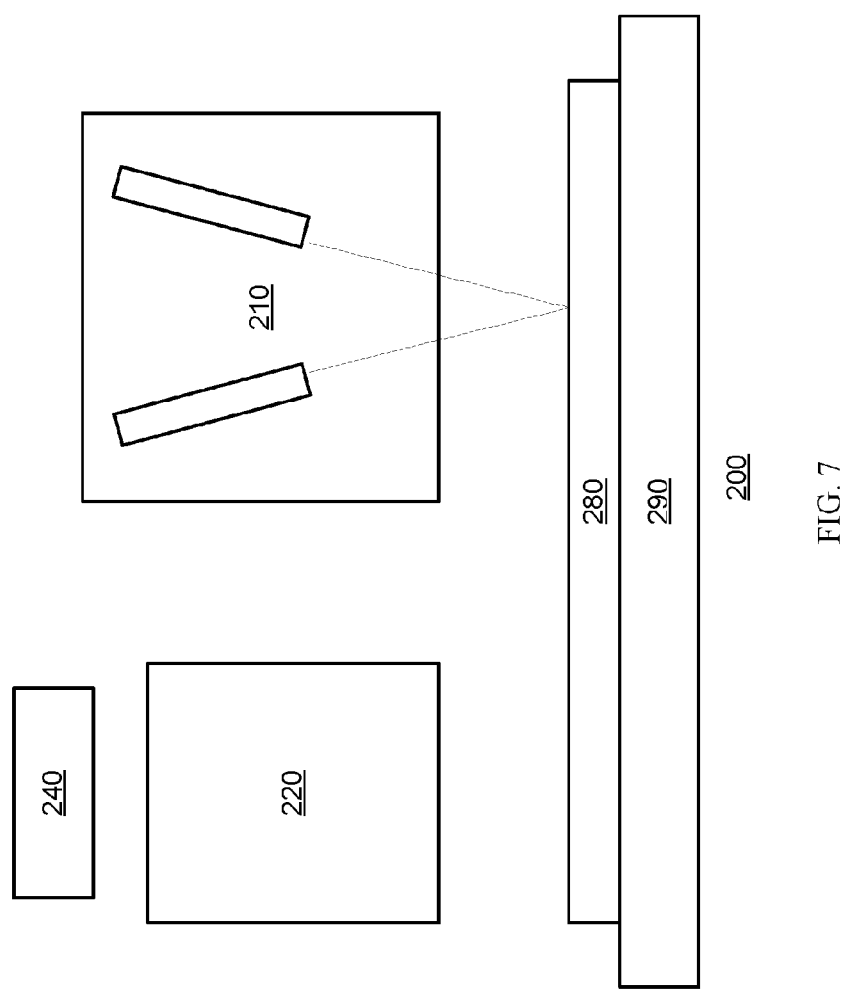
Figure 8:
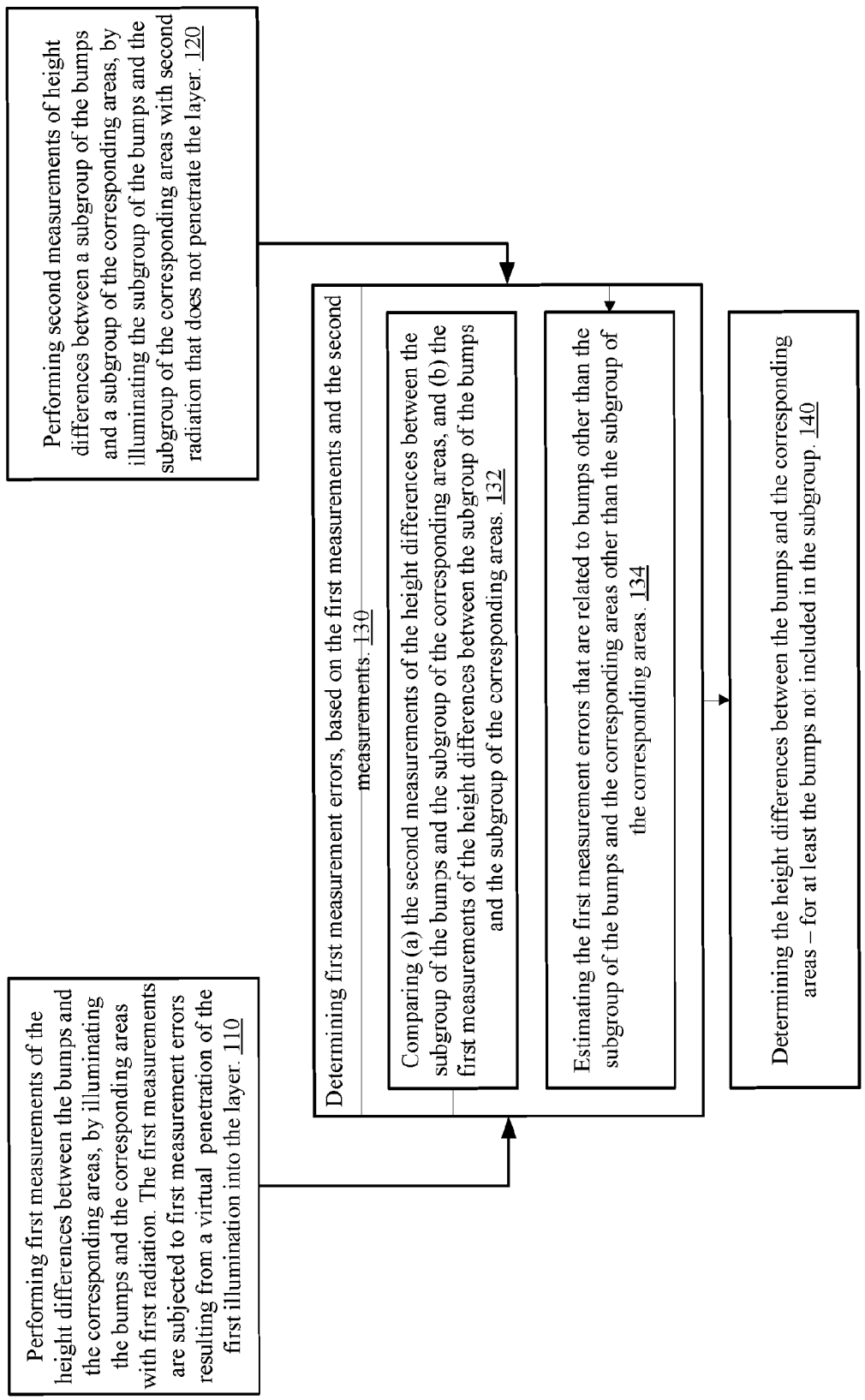

The present invention will be understood and appreciated more fully from the following detailed description taken in conjunction with the drawings in which:

FIG. 1 illustrates a first phase of a process;
FIG. 2 illustrates a second phase of a process;
FIG. 3 illustrates a third phase of a process; and
FIG. 4 illustrates a wafer and first till fifth radial sent of selected bumps;
FIG. 5 illustrates a wafer and first till fifth estimated factors;
FIG. 6 illustrates a wafer and bumps;
FIG. 7 illustrates an example of a system; and
FIG. 8 illustrates an example of a method.

DETAILED DESCRIPTION OF THE INVENTION

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer program product that stores instructions that once executed by a computer result in the execution of the method. The non-transitory computer program product may be a chip, a memory unit, a disk, a compact disk, a non-volatile memory, a volatile memory, a magnetic memory, a memristor, an optical storage unit, and the like.

Any reference in the specification to a system should be applied mutatis mutandis to a method that can be executed by the system and should be applied mutatis mutandis to a non-transitory computer program product that stores instructions that once executed by a computer result in the execution of the method.

Any reference in the specification to a non-transitory computer program product should be applied mutatis mutandis to a method that can be executed when applying the instructions stored in the non-transitory computer program product and should be applied mutatis mutandis to a system capable of executing the instructions stored in the non-transitory computer program product.

The term "comprising" is synonymous with (means the same thing as) "including," "containing" or "having" and is inclusive or open-ended and does not exclude additional, unrecited elements or method steps.

The term "consisting" is a closed (only includes exactly what is stated) and excludes any additional, unrecited elements or method steps.

The term "consisting essentially of" limits the scope to specified materials or steps and those that do not materially affect the basic and novel characteristics.

In the claims and specification any reference to the term "comprising" (or "including" or "containing") should be applied mutatis mutandis to the term "consisting" and should be applied mutatis mutandis to the phrase "consisting essentially of".

In the claims and specification any reference to the term "consisting" should be applied mutatis mutandis to the term "comprising" and should be applied mutatis mutandis to the phrase "consisting essentially of".

In the claims and specification any reference to the phrase "consisting essentially of" should be applied mutatis mutandis to the term "comprising" and should be applied mutatis mutandis to the term "consisting".

In the following specification, the invention will be described with reference to specific examples of embodiments of the invention. It will, however, be evident that various modifications and changes may be made therein without departing from the broader spirit and scope of the invention as set forth in the appended claims.

There is provided a system and method for calculating a height difference between a top of a bump and an upper surface of a top layer that is at least partially transparent to radiation such as white light. The top layer may be made of PI and/BPO.

Referring to FIG. 1—it may be desired to measure the height difference between (a) the top (11') of the bump 11, and (b) an upper surface 12' of the top layer 12. The height of a top of a bump is denoted TopBumpHeight 21. The height of the upper surface of the top layer is denoted UpperSurfaceHeight 22.

An illuminating visual light beam 71 propagates at a first angle 91 until reaching the top layer and then changes its propagation angle to a second propagation angle 92 and progresses (see 72) within the top layer until impinging on the top of the base layer 13 to provide a reflected light beam 73 that propagates within the top layer till reaching air, changing its propagation angle, and continuing to propagate in air to provide detected light beam 74.

The virtual plane 18 is a virtual reflection plane that virtually continues the progress of the illumination light beam 71 within the top layer had the first angle 91 maintained in the top layer (see virtual line of propagation 81)—and virtually coincides (see arrow 82) with the detected light beam 74.

The height of a top of a bump is denoted TopBumpHeight 21. The height of the upper surface of the top layer is denoted UpperSurfaceHeight 22.

The location of the internal portion corresponds to the virtual penetration depth. The virtual penetration depth of the visible light in the top layer is denoted PenetrateDepth 24.

Thus—the measured height may equal UpperSurfaceHeight−PenetrateDepth.

Accordingly—the height difference measured by the visual light based triangulation equals: MeasuredHeightDifference 23=(TopBumpHeight+PenetrateDepth)−UpperSurfaceHeight.

FIG. 1 illustrates a first phase during which visual light based triangulation is applied to provide MeasuredHeightDifference 23 which is an example of a first measurement of the height difference.

UpperSurfaceHeight is the height of the top surface 12' of top layer 12. The top layer 12 is positioned above base layer 13. FIG. 1 also illustrates an intermediate element 19 formed on the base layer 13. The bump 11 is formed on the intermediate element 19.

TopBumpHeight 21 is the measured height of the top (11') of bump 11.

PenetrateDepth 24 is the virtual penetration depth of the first radiation within top layer 12. This virtual penetration introduced a first measurement error—as the first measurement actually measures a height of the virtual penetration—which equals (UpperSurfaceHeight−PenetrateDepth).

(UpperSurfaceHeight−PenetrateDepth) is measured in proximity of the bump—at a points that can be regarded as an area the corresponds to the bump.

The first measurement of the height difference (for example MeasuredHeightDifference 23) equals TopBumpHeight minus (UpperSurfaceHeight−PenetrateDepth).

MeasuredHeightDifference=(TopBumpHeight+PenetrateDepth)−UpperSurfaceHeight.

MeasuredHeightDifference is done by measuring (UpperSurfaceHeight−PenetrateDepth) near each bump to be measured.

This phase is applied on a group of bumps—for example all bumps in the wafer.

FIG. 2 illustrates a second phase during an accurate height measurement—such as CLIp interferometry that uses radiation that does not penetrate the top layer and provides an AccurateHeightDifference 25.

The AccurateHeightDifference 25 is an example of a second measurements of a height difference.

The second phase is applied only on a subgroup of the group of bumps. The group of bumps may include all bumps of a wafer or only some of the bumps of the wafer.

Thus—for each bump of the subgroup of bumps there is provided an inaccurate MeasuredHeightDifference and the accurate AccurateHeightDifference.

The second phase (see FIG. 3) is followed by a third phase of estimating one or more correction factors (that may be an estimated virtual penetration depth—EstimatedPenetrateDepth 26).

The estimate may include, for example subtracting AccurateHeightDifference from MeasuredHeightDifference to provide the EstimatedPenetrateDepth.

The subgroup of bumps may be virtually partitioned to sets—for example FIG. 4 illustrates first till fifth radial sets of selected bumps 31, 32, 33, 34 and 35 respectively.

Each set may include bumps that are located at the same distance from the center of the wafer.

Different sets are located at different distances from the center of the wafer.

The radial sets are merely an example how to sample the bumps of the wafer. Any sampling scheme may be provided—for example the samples bumps may be arranged as a rectangular grid, as any ordered array (of any shape and size), as an unordered array, and the like.

The correction factors (first measurement errors) of each set are processed (for example—averaged) to provide a correction factor per set.

For example—FIG. 5 illustrates first till fifth estimated correction factors (first measurement errors) 41, 42, 43, 44 and 45 that are calculated based on the correction factors of the first till fifth radial sets of selected bumps 31, 32, 33, 34 and 35 of FIG. 4.

A fourth phase (see FIG. 6) includes evaluating the correction factor of bumps (30') that do not belong to the subgroup. An evaluation of a correction factor of a bump that belongs to the group but does not belong to the subgroup is based on one or more calculated correction factors and the spatial relationship between the bump and one or more radial sets of selected bumps.

The evaluation may include interpolation or otherwise estimating the correction factor based on already calculated correction factors.

It should be noted that the sets of bumps may be arranged in other manner—and not just in radial sets. The location of the bumps of a set may correspond to bumps that have the same or similar correction factor.

The number of sets may be two, three, four or more than five.

The method provides an excellent trade-off between accuracy and time of inspection. Only some of the bumps are measured using both first and second phases—which saves time. The estimation of correction factors is accurate enough.

FIG. 7 is an example of a measurement system 200.

Measurement system 200 is configured to measure height differences between tops of multiple bumps and corresponding areas of an upper surface of a layer.

The measurement system 200 may include one or more measurement units and at least one processing unit that are configured to:

a. Perform first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that is proximate to the bump.

b. Preform second measurements of height differences between a subgroup of the bumps and a subgroup of the corresponding areas, by illuminating the subgroup of the bumps and the subgroup of the corresponding areas with second radiation that does not penetrate the layer; wherein a duration of a second measurement exceeds a duration of a first measurement.

c. Determine first measurement errors, based on the first measurements and the second measurements.

d. Determine the height differences between the bumps and the corresponding areas based on the first measurements and the first measurements errors.

The one or more measurement units may include a first measurement unit for executing the first measurements and a second measurement unit for executing the second measurements.

In FIG. 7 the first measurement unit is a triangulation unit 210 that may be a white light triangulation sensor. See, for example, U.S. Pat. No. 8,363,229.

In FIG. 7 the second measurement unit is an interferometer 220.

In FIG. 7 the wafer 280 is supported by a chuck 290 and there is illustrated a processing unit 240.

The determining of the first measurement errors and/or the determining of the height differences may be executed by the at least one processing unit. The at least one processing unit may belong to the one or more measurement units or may not belong to the one or more measurement units.

The processing unit may be a server, a desktop computer, a hardware accelerator, and the like.

The measurement system may include other parts and/or components such as a mechanical stage, and the like.

FIG. 8 illustrates an example of a method 100 for measuring height differences between tops of multiple bumps and corresponding areas of an upper surface of a layer.

Each bump has a corresponding area—which is the area that is proximate to the bump. Proximate may be within a millimetric distance (for example less than a centimeter or a fraction of centimeter). The corresponding area may be closer to the bump in relation to another bump. The corresponding area may contact the bump and/or surround the bump. The corresponding area may be of any shape or size—for example may be of millimetric scale. The corresponding area may be of a size that may equal (or may be slightly bigger than) a size of a spot of radiation (first radiation and/or second radiation). Alternatively—the corresponding area may be much bigger than the size of a spot of radiation.

Method 100 may include steps 110 and 120.

Step 110 may include performing first measurements of the height differences between the bumps and the corresponding areas, by illuminating the bumps and the corresponding areas with first radiation. The first measurements are subjected to first measurement errors resulting from a virtual penetration of the first illumination into the layer.

Step 120 may include preforming second measurements of height differences between a subgroup of the bumps and a subgroup of the corresponding areas, by illuminating the subgroup of the bumps and the subgroup of the corresponding areas with second radiation that does not penetrate the layer.

The subgroup of the bumps (associated with step 120) may be a fraction of the bumps (associated with step 110). The fraction may be up to (1/Q) of the bumps, wherein Q may be 2, 3, 4, 5, 6, 7, 8 and more.

The selection of the value of the fraction may provide a tradeoff between throughput and accuracy. Smaller fractions will speed up the execution of method 100 but may provide a less accurate measurement.

A duration of a second measurement (single height different measurement) may exceed a duration of a first measurement (single height different measurement).

The duration of a second measurement may exceed the duration of a first measurement may a factor of at least 2, 4, 5, 10, 15, 20, and even more.

A first measurement and/or a second measurement of a height difference may include measuring or receiving the height of a top of the bump, and measuring the height of a corresponding area.

Step 110 may precede step 120. Step 110 may follow step 120.

Step 110 may be executed in parallel to step 120.

At least some first measurements may taken in parallel to at least some second measurements. Such a timing overlap may be obtained when one measurement does not interfere with another measurement.

The first radiation may be white light.

The layer may include at least one of Photo-definable polyimides and polybenzoxazoles.

Step 110 may include performing white light triangulation. See, for example, U.S. Pat. No. 8,363,229.

Step 120 may include performing interferometry.

Steps 110 and 120 may be followed by step 130 of determining first measurement errors, based on the first measurements and the second measurements.

Step 130 may include steps 132 and 134.

Step 132 may include comparing (a) the second measurements of the height differences between the subgroup of the bumps and the subgroup of the corresponding areas, and (b) the first measurements of the height differences between the subgroup of the bumps and the subgroup of the corresponding areas.

The difference between (a) and (b) reflect measured first measurement errors that are related to the subgroup of the bumps and the subgroup of the corresponding areas.

Step 134 may include estimating the first measurement errors that are related to bumps other than the subgroup of the bumps and the corresponding areas other than the subgroup of the corresponding areas. Step 134 is based in part on the outcome of step 132.

The bumps may be spread along a round semiconductor substate, and the subgroup of the bumps are positioned at spaced apart annual regions of the semiconductor substrate wafer.

Step 134 may include extrapolation.

Step 134 may include performing radial based extrapolation. The radial based extrapolation may include estimating a first measurement error related to a bump based on a distance of the bump from a center of the bump.

Step 130 may be followed by step 140 of determining the height differences between the bumps and the corresponding areas—for at least the bumps not included in the subgroup.

For the bumps of the subgroup—the accurate height difference were measured in step 120.

For the bumps that do not belong to the subgroup—step 140 may include subtracting the first measurement errors from the first measurements.

For example—for example—subtracting EstimatedPenetrateDepth from the MeasuredHeightDifference.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

I claim:

1. A method for measuring height differences between tops of multiple bumps and corresponding areas of an upper surface of a layer, the method comprises:
   performing first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that is proximate to the bump;
   preforming second measurements of height differences between a subgroup of the bumps and a subgroup of the corresponding areas, by illuminating the subgroup of the bumps and the subgroup of the corresponding areas with second radiation that does not penetrate the layer; wherein a duration of a second measurement exceeds a duration of a first measurement;
   determining first measurement errors, based on the first measurements and the second measurements; and
   determining the height differences between the bumps and the corresponding areas based on the first measurements and the first measurements errors.

2. The method according to claim 1 wherein the bumps are spread along a round semiconductor substate, and wherein the subgroup of the bumps are positioned at spaced apart annual regions of the semiconductor substate wafer.

3. The method according to claim 1 wherein the subgroup of the bumps comprise less than ten percent of the bumps.

4. The method according to claim 1 wherein the first radiation is white light.

5. The method according to claim 1 wherein the layer comprises at least one of Photo-definable polyimides and polybenzoxazoles.

6. The method according to claim 1 wherein the determining of the height differences between the bumps and the corresponding areas comprises estimating the first measurements errors related to (a) bumps that do not belong to the subgroup of the bumps, and (b) corresponding areas that do not belong to the subgroup of corresponding areas.

7. The method according to claim 6 wherein the estimating of the first measurements errors comprises extrapolation.

8. The method according to claim 6 wherein the estimating of the first measurements errors comprises performing radial based extrapolation.

9. The method according to claim 1 wherein the performing of the first measurements comprises performing white light triangulation.

10. The method according to claim 1 wherein the performing of the second measurements comprises performing interferometry.

11. A measurement system for measuring height differences between tops of multiple bumps and corresponding areas of an upper surface of a layer, the system comprises:
    one or more measurement units and at least one processing unit that are configured to:
    perform first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that is proximate to the bump;

preform second measurements of height differences between a subgroup of the bumps and a subgroup of the corresponding areas, by illuminating the subgroup of the bumps and the subgroup of the corresponding areas with second radiation that does not penetrate the layer; wherein a duration of a second measurement exceeds a duration of a first measurement;

determine first measurement errors, based on the first measurements and the second measurements; and determine the height differences between the bumps and the corresponding areas based on the first measurements and the first measurements errors.

12. The measurement system according to claim 11 wherein the bumps are spread along a round semiconductor substate, and wherein the subgroup of the bumps are positioned at spaced apart annual regions of the semiconductor substate wafer.

13. The measurement system according to claim 11 wherein the subgroup of the bumps comprise less than ten percent of the bumps.

14. The measurement system according to claim 11 wherein the first radiation is white light.

15. The measurement system according to claim 11 wherein the layer comprises at least one of Photo-definable polyimides and polybenzoxazoles.

16. The measurement system according to claim 11 wherein the measurement system is configured to determine height differences between the bumps and the corresponding areas by estimating the first measurements errors related to (a) bumps that do not belong to the subgroup of the bumps, and (b) corresponding areas that do not belong to the subgroup of corresponding areas.

17. The measurement system according to claim 16 wherein the estimating of the first measurements errors comprises extrapolation.

18. The measurement system according to claim 16 wherein the measurement system is configured to perform radial based extrapolation.

19. The measurement system according to claim 11 wherein a first measurement unit is a white light triangulation unit.

20. The measurement system according to claim 11 wherein a second measurement unit is an interferometer.

21. A non-transitory computer readable medium for measuring height differences between tops of multiple bumps and corresponding areas of an upper surface of a layer, the non-transitory computer readable medium storing instructions for:

performing first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that is proximate to the bump;

preforming second measurements of height differences between a subgroup of the bumps and a subgroup of the corresponding areas, by illuminating the subgroup of the bumps and the subgroup of the corresponding areas with second radiation that does not penetrate the layer; wherein a duration of a second measurement exceeds a duration of a first measurement;

determining first measurement errors, based on the first measurements and the second measurements; and determining the height differences between the bumps and the corresponding areas based on the first measurements and the first measurements errors.

* * * * *